United States Patent
Welsh et al.

(10) Patent No.: US 10,906,636 B2
(45) Date of Patent: Feb. 2, 2021

(54) VIBRATION CONTROL ASSEMBLY FOR AN AIRCRAFT AND METHOD OF CONTROLLING AIRCRAFT VIBRATION

(71) Applicant: Sikorsky Aircraft Corporation, Stratford, CT (US)

(72) Inventors: William A. Welsh, North Haven, CT (US); Yuriy Gmirya, Woodbridge, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 591 days.

(21) Appl. No.: 15/520,024

(22) PCT Filed: Oct. 21, 2015

(86) PCT No.: PCT/US2015/056566
§ 371 (c)(1),
(2) Date: Apr. 18, 2017

(87) PCT Pub. No.: WO2016/064952
PCT Pub. Date: Apr. 28, 2016

(65) Prior Publication Data
US 2017/0334553 A1 Nov. 23, 2017

Related U.S. Application Data

(60) Provisional application No. 62/066,546, filed on Oct. 21, 2014.

(51) Int. Cl.
*B64C 27/00* (2006.01)
*F16F 1/00* (2006.01)
*F16F 15/02* (2006.01)

(52) U.S. Cl.
CPC .............. *B64C 27/001* (2013.01); *F16F 1/00* (2013.01); *F16F 15/02* (2013.01)

(58) Field of Classification Search
CPC ............ B64C 27/001; F16F 1/00; F16F 15/02
See application file for complete search history.

(56) References Cited

U.S. PATENT DOCUMENTS 2,369,845 A 2/1945 Noxon
2,722,124 A 11/1955 Smith
(Continued)

FOREIGN PATENT DOCUMENTS

CA 830745 A 12/1969
CA 2022531 A1 2/1991
(Continued)

OTHER PUBLICATIONS

International Search Report and Written Opinion of the International Search Authority dated Jan. 11, 2016 in related PCT Application No. PCT/US2015/56566, 9 pages.
(Continued)

*Primary Examiner* — Victor L MacArthur
(74) *Attorney, Agent, or Firm* — Foley & Lardner LLP

(57) ABSTRACT

A vibration control assembly for an aircraft including a housing operatively coupled to the aircraft. Also included is a cage disposed within an interior region of the housing, the cage rotatable within the housing about a first axis. Further included is a gyroscope wheel disposed within the cage and rotatable about a second axis other than the first axis, wherein a controllable moment is imposed on the aircraft upon rotation of the gyroscope wheel to counter vibratory moments produced by the vehicle.

15 Claims, 8 Drawing Sheets

(56) References Cited

U.S. PATENT DOCUMENTS

| | | | |
|---|---|---|---|
| 3,931,742 | A | 1/1976 | Shirley |
| 4,518,313 | A | 5/1985 | Jensen et al. |
| 5,368,271 | A * | 11/1994 | Kiunke ................ F16F 15/02 248/179.1 |
| 5,628,267 | A | 5/1997 | Hoshio et al. |
| 8,002,251 | B2 | 8/2011 | Hindle et al. |
| 2005/0075210 | A1 | 4/2005 | Frederickson |
| 2009/0116963 | A1 | 5/2009 | Welsh |
| 2010/0003133 | A1 | 1/2010 | Welsh |
| 2010/0275705 | A1 | 11/2010 | Johnson |
| 2011/0027081 | A1 | 2/2011 | Jolly et al. |
| 2013/0233100 | A1 | 9/2013 | Kim |

FOREIGN PATENT DOCUMENTS

| | | |
|---|---|---|
| DE | 19640277 A1 | 3/1997 |
| GB | 1120193 A | 7/1968 |
| WO | WO9317261 A1 | 9/1993 |

OTHER PUBLICATIONS

Extended European Search Report for European Application No. 15853433.9; Report dated Apr. 18, 2018 (pp. 1-11).
International Preliminary Report on Patentability for International Application No. PCT/US2015/056566; International Filing Date Oct. 21, 2015; Report dated Apr. 24, 2017 (pp. 1-6).

* cited by examiner

VIBRATION CONTROL ASSEMBLY FOR AN AIRCRAFT AND METHOD OF CONTROLLING AIRCRAFT VIBRATION

CROSS-REFERENCE TO RELATED APPLICATIONS

The present application is a 371 National Stage of International Patent Application No. PCT/US2015/056566, filed on Oct. 21, 2015, which claims priority to U.S. Provisional Application No. 62/066,546, filed on Oct. 21, 2014, the contents of which are incorporated herein by reference in their entirety.

BACKGROUND OF THE INVENTION

The embodiments herein generally relate to aircrafts and, more particularly, to a vibration control assembly for an aircraft and methods of controlling aircraft vibration with one or more gyroscope assemblies.

All helicopter rotors produce undesirable vibratory hub moments that cause unwanted fuselage vibration. The largest moments are in the pitching and rolling moment directions. These moments produce an elliptical shape as time progresses. More generally, there are three moments which produce an ellipsoidal shape. Typically, active vibration control techniques use linear vibratory force actuators placed some distance apart in order to create a countering or anti-vibration moment. This approach undesirably adds significant weight because the linear actuators rely upon linearly oscillating a parasitic mass to generate load. However, the amplitudes of mass oscillation are limited due to space or other constraints, resulting in heavy designs that are deemed inefficient based on the moment produced relative to the weight. The reduction in payload capability of the aircraft is not desirably offset by the benefits associated with the counter-moment effects.

BRIEF DESCRIPTION OF THE INVENTION

According to one embodiment, a vibration control assembly for an aircraft including a housing operatively coupled to the aircraft. Also included is a cage disposed within an interior region of the housing, the cage rotatable within the housing about a first axis. Further included is a gyroscope wheel disposed within the cage and rotatable about a second axis other than the first axis, wherein a controllable moment is imposed on the aircraft upon rotation of the gyroscope wheel to counter vibratory moments produced by the vehicle.

In addition to one or more of the features described above, or as an alternative, further embodiments may include a planetary gear arrangement configured to transmit power to the gyroscope wheel to rotate the gyroscope wheel about the second axis.

In addition to one or more of the features described above, or as an alternative, further embodiments may include that the planetary gear arrangement transmits power to the gyroscope wheel directly from an electric motor shaft of an electric motor.

In addition to one or more of the features described above, or as an alternative, further embodiments may include that the planetary gear arrangement transmits power to the gyroscope wheel directly from a hydraulic motor shaft of a hydraulic motor.

In addition to one or more of the features described above, or as an alternative, further embodiments may include that the planetary gear arrangement is coupled to an aircraft gearbox with a gearbox shaft.

In addition to one or more of the features described above, or as an alternative, further embodiments may include a motor operatively coupled to the cage with a motor shaft to rotate the cage and to control precession of the vibration control assembly, the motor shaft rotatable about a motor axis, wherein a sun gear of the planetary gear arrangement rotates about a sun gear axis that coincides with the motor axis.

In addition to one or more of the features described above, or as an alternative, further embodiments may include a motor operatively coupled to the cage to rotate the cage and to control precession of the vibration control assembly.

In addition to one or more of the features described above, or as an alternative, further embodiments may include that the motor is operatively coupled to the gyroscope wheel and drives rotation of the gyroscope wheel.

In addition to one or more of the features described above, or as an alternative, further embodiments may include a slip ring disposed between the motor and the cage.

In addition to one or more of the features described above, or as an alternative, further embodiments may include that the aircraft comprises a plurality of vibration control assemblies.

In addition to one or more of the features described above, or as an alternative, further embodiments may include that the plurality of vibration control assemblies comprises two vibration control assemblies.

In addition to one or more of the features described above, or as an alternative, further embodiments may include that the plurality of vibration control assemblies comprises four vibration control assemblies.

In addition to one or more of the features described above, or as an alternative, further embodiments may include that the gyroscope wheel is rotated at a substantially constant speed.

According to another embodiment, a method of controlling vibration on an aircraft. The method includes rotating a cage about a cage axis, the cage disposed within a housing. The method also includes rotating a gyroscope wheel about a gyroscope wheel axis that is non-parallel to the cage axis, the gyroscope wheel disposed within the cage. The method further includes producing a moment on the aircraft upon rotating the gyroscope wheel, wherein the cage and gyroscope wheel partially form a first vibration control assembly. The method yet further includes controlling precession of the first vibration control assembly with the rotation of the cage.

In addition to one or more of the features described above, or as an alternative, further embodiments may include controlling the moment produced on the aircraft by varying a rotational speed of the gyroscope wheel.

In addition to one or more of the features described above, or as an alternative, further embodiments may include controlling precession of the first vibration control assembly by varying a rotational speed of the cage.

In addition to one or more of the features described above, or as an alternative, further embodiments may include that the cage is rotated with a motor operatively coupled to the cage.

In addition to one or more of the features described above, or as an alternative, further embodiments may include that the gyroscope wheel is rotated with an electric motor operatively coupled to the gyroscope wheel with a planetary gear arrangement.

In addition to one or more of the features described above, or as an alternative, further embodiments may include that the gyroscope wheel is rotated with a gearbox shaft of an aircraft gearbox, the gearbox shaft operatively coupled to the gyroscope wheel with a planetary gear arrangement.

In addition to one or more of the features described above, or as an alternative, further embodiments may include that precession is in a plane that varies with time to produce a moment that results in a three-dimensional ellipsoid.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1:
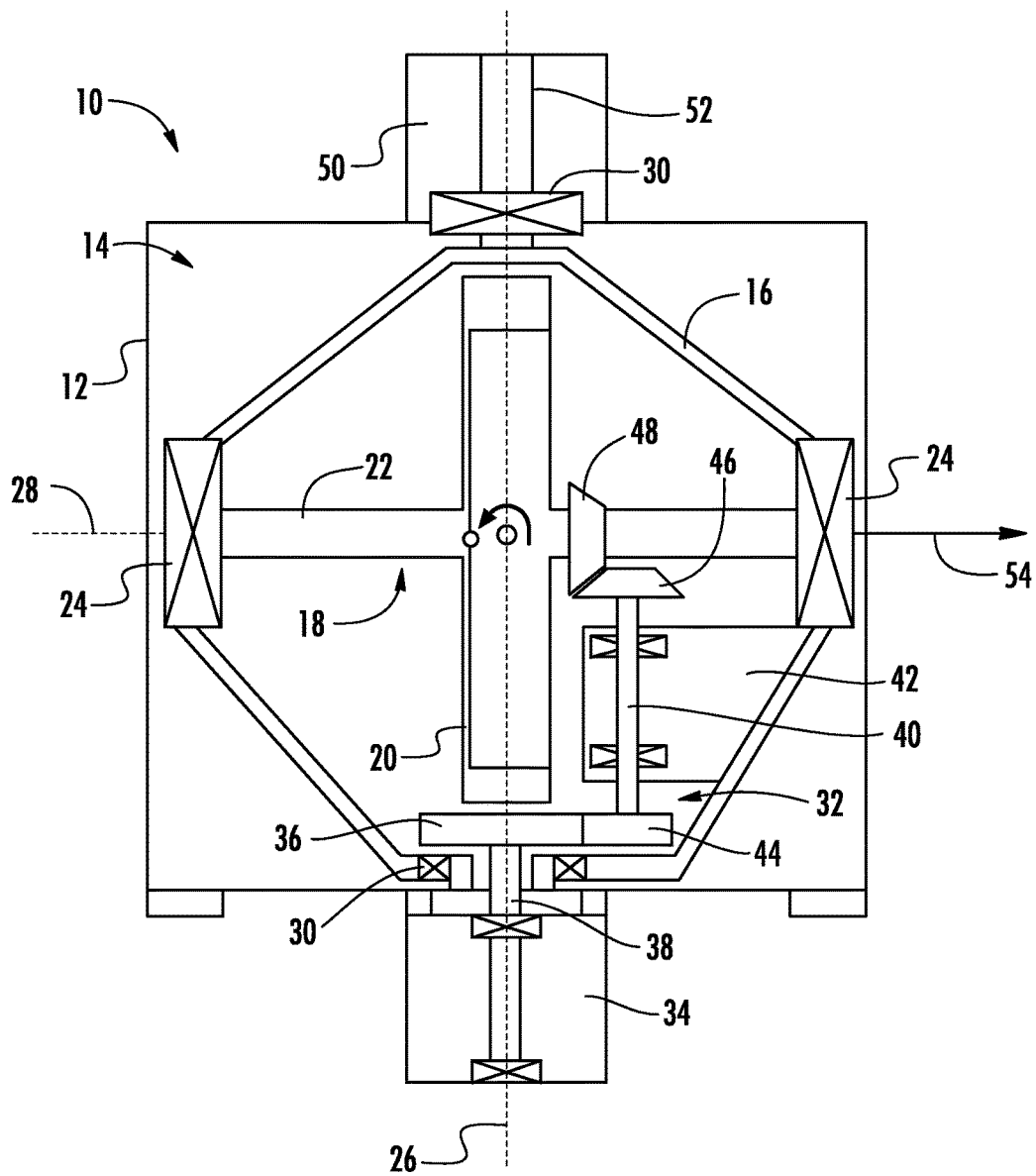
FIG. 1 is a vibration control assembly according to an embodiment of the invention.

Referring to FIG. 1, illustrated is an active vibration control system that employs one or more vibratory control moment gyroscopes, also referred to herein as a vibration control assembly 10. The vibration control assembly 10 is illustrated according to one embodiment in FIG. 1. It is contemplated that any structure, particularly vehicles, that inherently produces vibration may benefit from the counteracting vibratory forces of the embodiments described herein. One such structure is an aircraft, such as a helicopter that is subjected to vibration due to moments generated by a rotor. The vibration control assembly 10 counters the vibratory moments to reduce overall vibrations that the structure (e.g., aircraft) is subjected to. In the case of a helicopter, the vibration control assembly 10 may be operatively coupled to a location proximate the main transmission.

The vibration control assembly 10 includes a housing 12 that is operatively coupled to the structure that is to undergo vibration reduction. The housing may be operatively coupled to the structure in any suitable manner, including mounting with mechanical fasteners or welded thereto. The housing 12 defines an interior region 14. A cage 16 is disposed within the interior region 14. In the illustrated embodiment, the cage 16 is formed of an octagon cross-section, but it is to be appreciated that various alternative geometries may be employed. Irrespective of the geometry of the cage 16, a gyroscope wheel 18 is disposed within the cage 16. The gyroscope wheel 18 includes a wheel segment 20 and a gyroscope shaft 22, with the gyroscope shaft 22 coupled to the cage 16 at both ends. Gyroscope bearings 24 are included at both ends of the gyroscope shaft 22 to retain the gyroscope wheel 18.

The cage 16 is rotatable within the housing 12 about a first axis 26 and the gyroscope wheel 18 is rotatable within the cage 16 about a second axis 28. The gyroscope bearings 24 are low friction bearings that allow the gyroscope wheel 18 to rotate at a high rate (e.g., up to 20,000 rpm), while also carrying a resulting gyroscopic moment that is produced. The rotation of the gyroscope wheel 18 produces a moment that passes through the gyroscope bearings 24, through the cage 16 and into cage bearings 30 that are located at opposite ends of the cage 16 proximate an interface between the cage 16 and the housing 12. The moment is then passed to the housing 12 and subsequently to the structure that the housing 12 is mounted to, thereby countering moments produced by the structure itself. The physics and dynamics of the countering will be described in detail below.

A planetary gear arrangement 32 is employed to facilitate rotation of the gyroscope shaft 22 by operatively coupling the gyroscope shaft 22 to a driving source, thereby transmitting power to the planetary gear arrangement 32. In the illustrated embodiment, the driving source is a motor 34 that may be an electric or hydraulic motor. Other driving sources are contemplated. For example, a mechanical variable speed take off from the main transmission may be employed, such that the driving source is not only electrical or hydraulic. The motor 34 is operatively coupled to a sun gear 36 with a motor shaft 38 that penetrates the housing 12 and the cage 16. A planet gear shaft 40 is retained within a gear retainer 42 within the cage 16 and includes a first planet gear 44 and a second planet gear 46. The first planet gear 44 is disposed in contact with the sun gear 36 and the second planet gear 46 is disposed in contact with a drive gear 48 that is coupled to the gyroscope shaft 22. This arrangement converts power from the motor 34 to rotational motion of the gyroscope shaft 22 about the second axis 28 and hence the gyroscope wheel 18. The motor speed varies dynamically between 0 and about 20,000 rpm depending upon desired moment output which is monitored and controlled by an outer-loop anti-vibration controller.

As noted above, the cage 16 is rotatable about a first axis 26. Rotation of the cage 16 is driven by a motor 50. The motor 50 includes a motor shaft 52 that is configured to penetrate the housing 12 and is operatively coupled to the cage 16. The rotational speed and phase of the motor 50 is controllable. As will be appreciated, rotation of the cage 16 controls precession of the gyroscope wheel 18. As the cage 16 is rotated, the gyroscope wheel 18 and the planetary gear arrangement 32 rotate with the cage 16, imparting precession of the gyroscope wheel 18. The combination of rotation of the gyroscope wheel 18 and the cage 16 generates a gyroscopic moment 54. The magnitude of the gyroscopic moment 54 is equal to the product of the precession speed, the gyroscope wheel speed and the mass moment of inertia of the gyroscope wheel.

In the illustrated embodiment, the sun gear 36 and the motor shaft 38 are coaxially aligned with each other and with the first axis 26 that the cage 16 rotates about. The first axis 26 coincides with the axis of rotation of the motor shaft 52. As the planet gears 44, 46 rotate, they orbit the sun gear 36. Motor torque is thus transmitted to the drive gear 48 that drives the gyroscope wheel 18. As torque is transmitted continuously to the planet gear 46, it transmits torque directly to the gyroscope shaft 22. Such an embodiment avoids the need for a rotating motor directly connected to the gyroscope wheel 18 to spin the gyroscope wheel 18, as well as obviates the need for slip rings to power such a motor.

Figure 2:
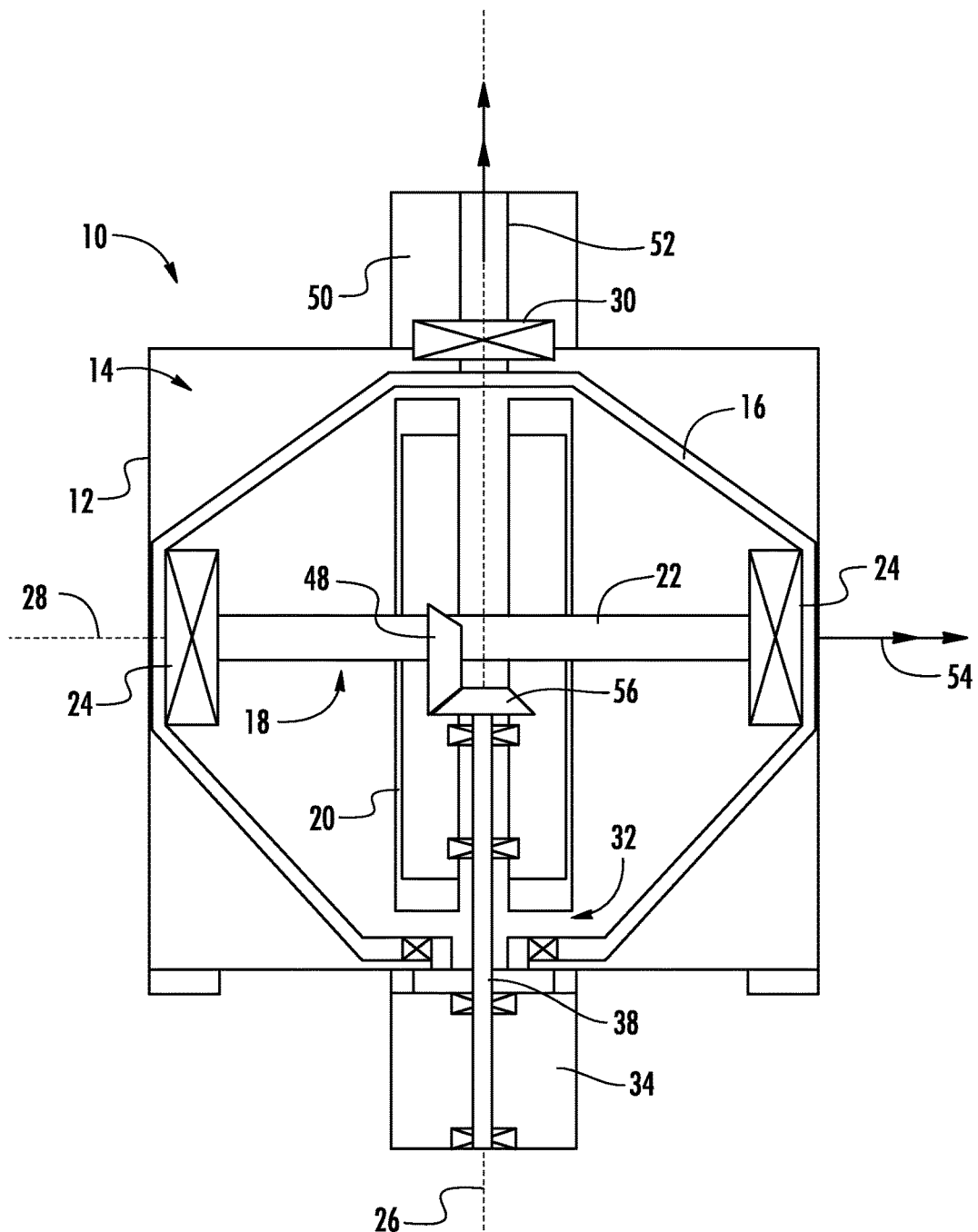
FIG. 2 is the vibration control assembly according to another embodiment of the invention.

Referring to FIG. 2, an alternative embodiment of the vibration control assembly 10 is illustrated. In particular, the planetary gear arrangement 32 is simplified. The motor 34 includes the motor shaft 38 that extends through the housing 12 and the cage 16 into close proximity with the gyroscope shaft 22 and has a gear 56 coupled thereto. The gear 56 is connected to the drive gear 48, which directly rotates the gyroscope shaft 22.

Figure 3:
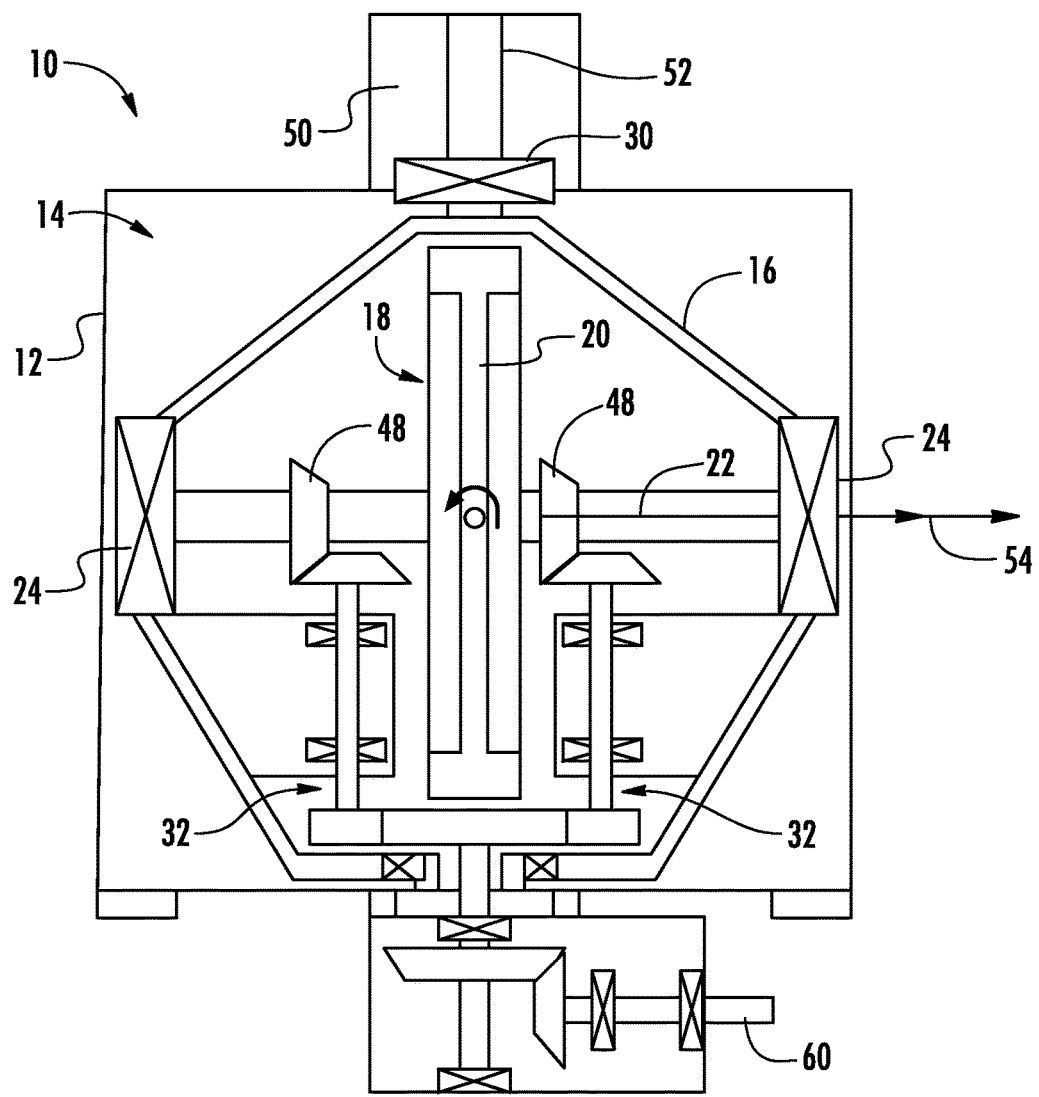
FIG. 3 is the vibration control assembly according to yet another embodiment of the invention.

Referring to FIG. 3, yet another embodiment of the vibration control assembly 10 is illustrated. As shown, power may be transmitted to the gyroscope shaft 22 without a dedicated motor. Specifically, a gearbox shaft 60 that extends from an existing gearbox of the vehicle, such as a main rotor gearbox of a helicopter. The gearbox shaft 60 is powered by an existing power source and is simply disposed in contact with the planetary gear arrangement 32 illustrated. The planetary gear arrangement 32 of FIG. 3 includes two planet gear shafts 40 that are both coupled to the sun gear 36. The embodiment described above and illustrated is merely exemplary, as one can appreciate that fewer or more planet gear shafts 40 may be employed.

Figure 4:
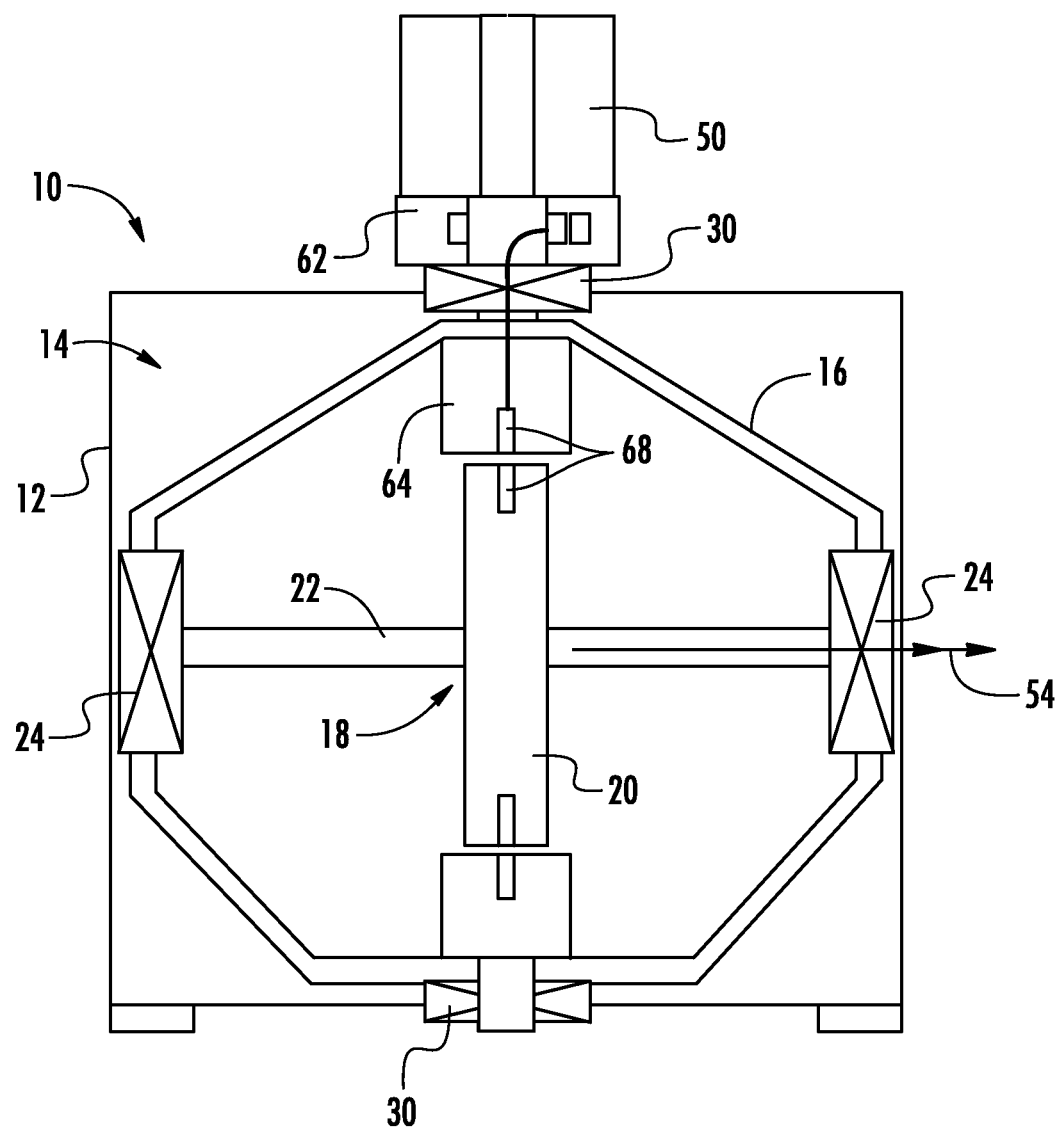
FIG. 4 is the vibration control assembly according to yet another embodiment of the invention.

Referring to FIG. 4, another embodiment of the vibration control assembly 10 is shown. In the illustrated embodiment, the motor 50 drives rotation of both the cage 16 and the gyroscope wheel 18. To facilitate the additional rotation of the gyroscope wheel 18, a slip ring 62 is disposed between the motor 50 and the cage 16. Electrical power is conducted to a motor stator 64. Electric motor permanent magnets 68 are included about the outer perimeter of the wheel portion 20 of the gyroscope wheel 18 and at an inner portion of the motor stator 64 to drive rotation of the gyroscope wheel 18.

Figure 6:
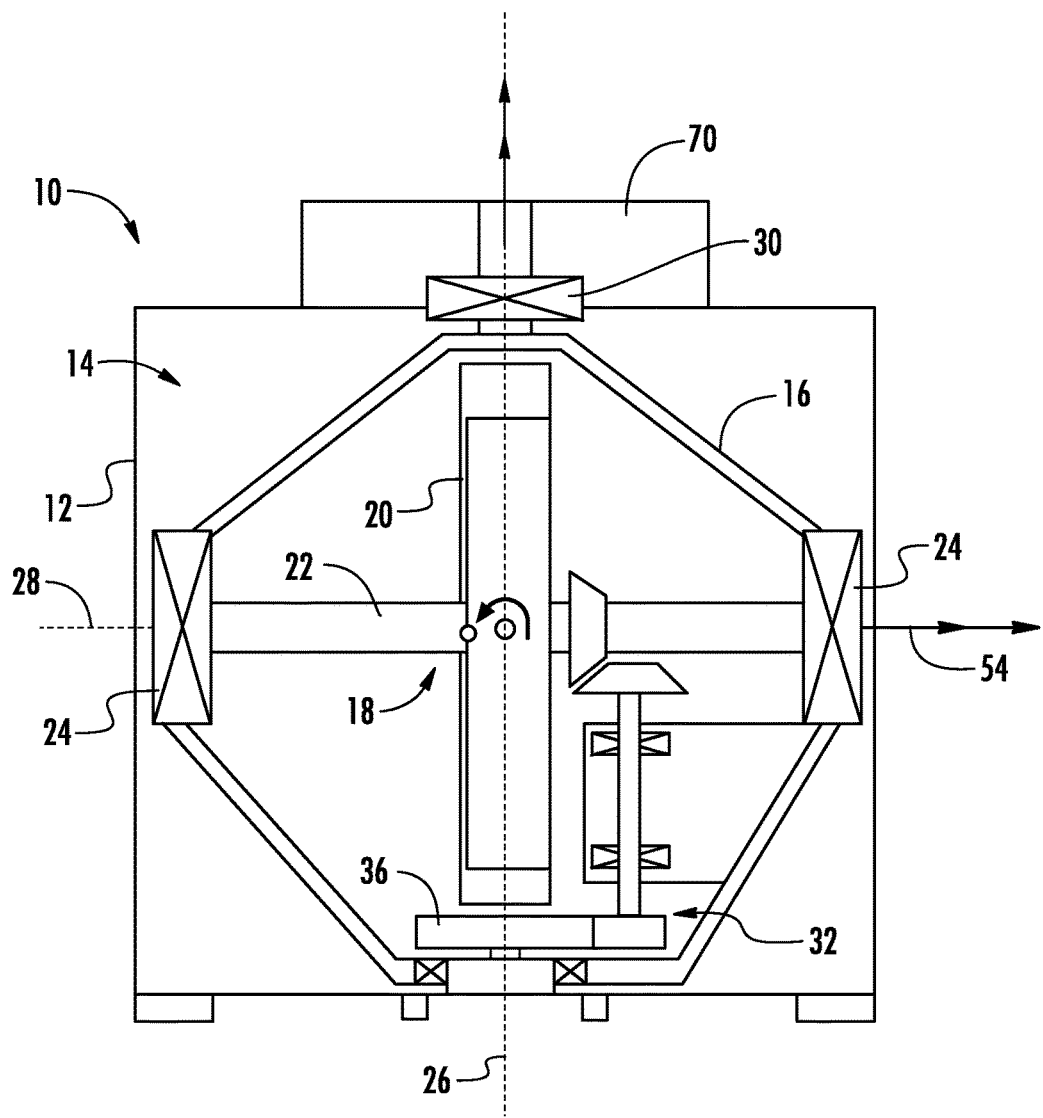
FIG. 6 is the vibration control assembly according to yet another embodiment.

Referring now to FIG. 6, an embodiment of the vibration control assembly 10 is shown with a single motor 70 driving rotation of the cage 16 and the gyroscope wheel 18. In this embodiment, the sun gear 36 does not rotate which allows the gyroscope wheel 18 to be driven when the gyroscope wheel 18 is precessed, thereby avoiding the need for a rotating motor directly connected to the gyroscope wheel 18 to spin the gyroscope wheel 18, as well as obviating the need for slip rings to power such a motor. The single motor 70 drives the gyroscope wheel 18 at a constant rotational speed in such an embodiment.

Irrespective of the precise configuration of the vibration control assembly 10, it is to be appreciated that a single assembly may be included or a plurality of vibration control assemblies may be included. For example, two or four vibration control assemblies are provided in some embodiments.

Figure 5:
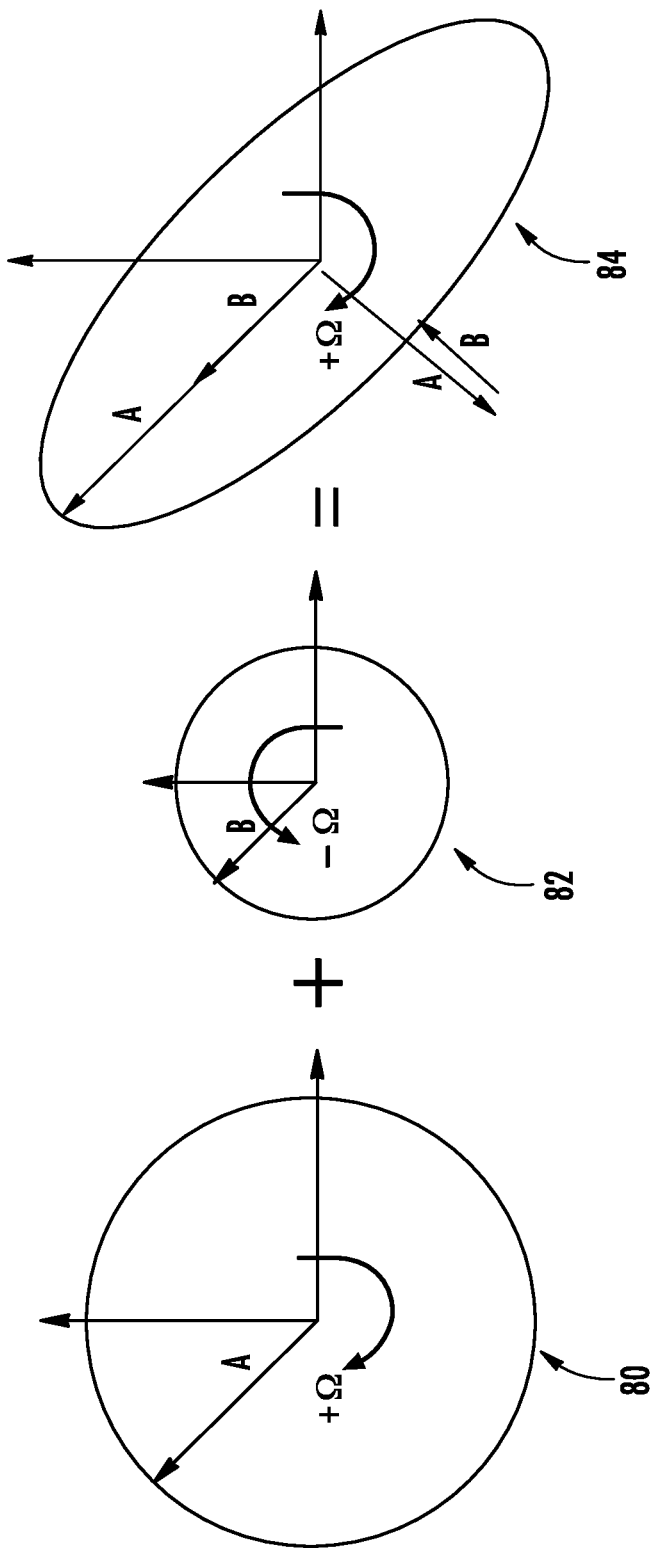
FIG. 5 illustrates instantaneous moment vectors of two vibration control assemblies and their summed moment path to counter vibratory moments.

Referring to FIG. 5, the physics and dynamics of the resultant moments imposed on the structure by two vibration control assemblies is illustrated at an instantaneous moment of time. Assuming that the gyroscope disks are rotating in the same direction, two assemblies (i.e., gyroscope wheels) that are forced to precess in opposite directions at a desired vibration-suppression frequency can be used to counter the undesirable moments produced by the structure (e.g., vehicle). A vibration control assembly 80 is controlled to precess in the clockwise direction at an angular speed of $+\Omega$ to produce a moment vector A. Vibration control assembly 82 is controlled to precess in the counterclockwise direction at an angular speed of $-\Omega$ to produce a moment vector B. Each produces a circular rotating moment vector A, B, with both vectors rotating or precessing at the frequency of the undesired vehicle vibration frequency. By various combinations of moment vector size (i.e., magnitude) and phase, any vibratory pitching or rolling moment ellipse 84, at any "tilt" may be produced. Advantageously, the resulting ellipse (including a circle) may be adjusted to counter the moment produced by the structure to result in a zero net moment on the structure, thereby producing extremely low vibration.

Figure 7:
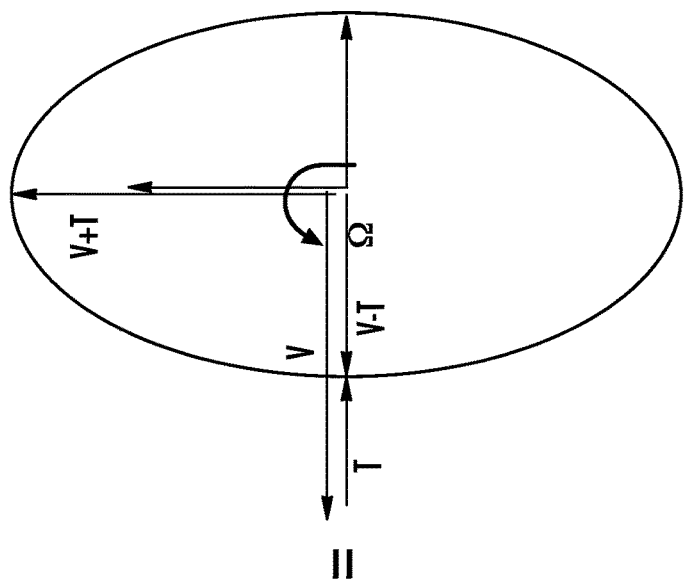
FIG. 7 illustrates instantaneous moment vectors of four vibration control assemblies and their summed moment path to counter vibratory moments.
Figure 7:
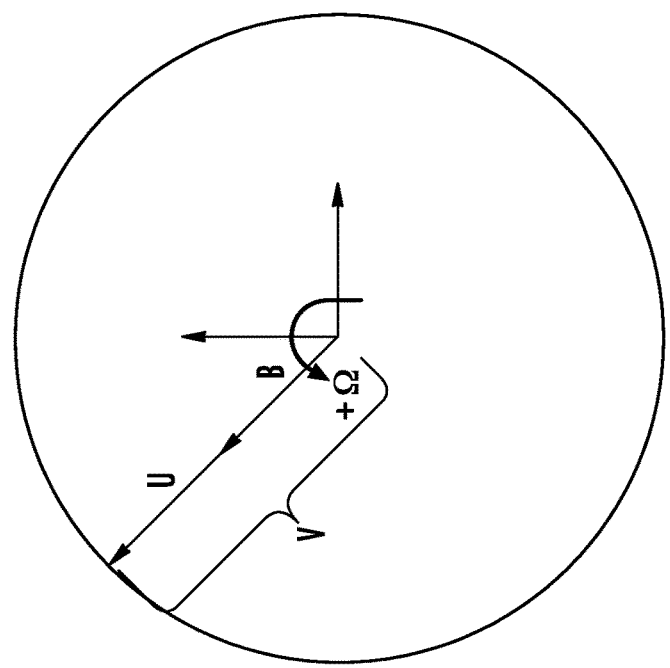
Figure 7:
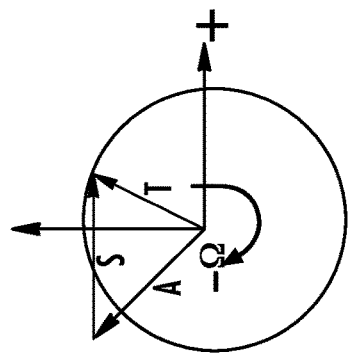

Referring to FIG. 7, a case where four vibration control assemblies are employed is illustrated. Such embodiments may be beneficial where the gyroscope wheel 18 rotates at a nearly constant speed, such as in the embodiments described in FIGS. 2 and 6, for example. In the illustration, four assemblies are represented with wheel speed designed to have spin speeds that are fixed ratios of the gearbox in the example of FIG. 2. As a result, vibratory moments A, S, B and U are all the same size. Two of the assemblies are made to precess in the same direction at the same speed $(-\Omega)$, but the precession angular position of the respective gyroscope wheels are selected such that moment vector A and moment vector S vectorially add so that the result is the desired moment T. Similarly, the other two assemblies are phased to produce net moment vector V through the vector addition of moment vector B and moment vector U. These two assemblies are made to precess in the opposite direction from the other two assemblies, but at the same speed (i.e., in the direction and precession speed $+\Omega$. The two circular moments rotating in opposite directions vectorially add to produce an elliptical moment pattern that may be controlled.

A single gyroscope of variable disk speed or two gyroscopes with constant disk speed may also be advantageous on a vehicle that exhibits a dominant, undesirable ambient vibration moment that is nearly circular. This is an arrangement that is particularly advantageous when it is desired to minimize vehicle weight at the cost of higher vibrations.

Advantageously, effective anti-vibration is achieved at a reduced weight requirement for assemblies employed to do so. The vibration control assembly, or assemblies, efficiently generate large anti-rotation moments by spinning the gyroscope wheel 18 faster, rather than increasing the travel of a linear-type actuator or the distance between linear-type actuators.

Figure 8:
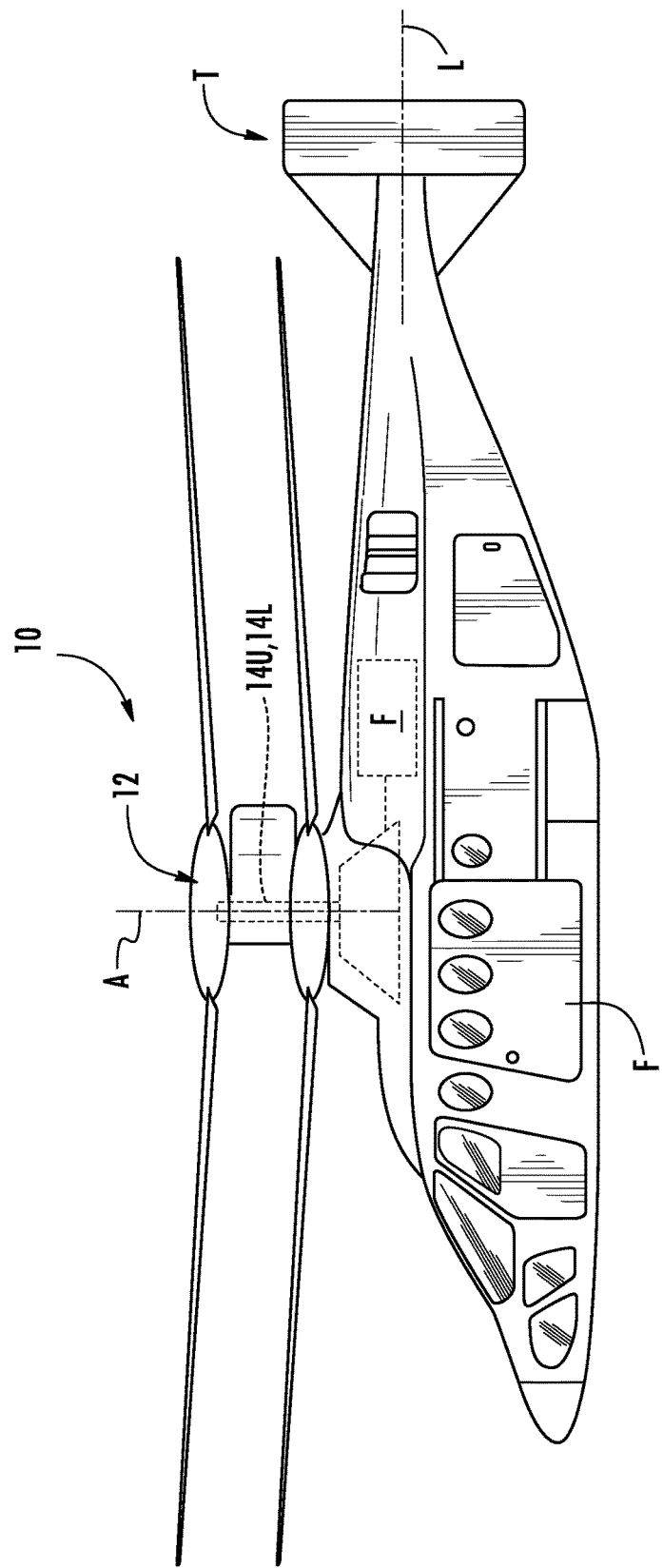
FIG. 8 illustrates an aircraft using the vibratory control assembly according to an embodiment.

FIG. 8 illustrates an aircraft using the vibratory control assembly according to an embodiment. In particular, a rotary-wing aircraft 100 having a dual, counter-rotating, coaxial rotor system 102 which rotates about a rotating main rotor shaft 14U, and a counter-rotating main rotor shaft 14L both about an axis of rotation A. The aircraft 100 includes an airframe F which supports the dual, counter rotating, coaxial rotor system 102 as well as an optional translational thrust system T which provides translational thrust during high speed forward flight generally parallel to an aircraft longitudinal axis L. Although a particular aircraft configuration is illustrated in the disclosed embodiment, other counter-rotating, coaxial rotor systems will also benefit from the present invention.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. By way of example, aspects can be used in conventional and/or coaxial rotary aircraft, fixed wing aircraft, maritime applications, industrial machinery, automotive applications, or other applications where vibrations need to be reduced. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A vibration control assembly for a vibration producing structure comprising:
   a housing operatively connectable to the vibration producing structure;
   a cage disposed within an interior region of the housing, the cage rotatable within the housing about a first axis;
   a gyroscope wheel disposed within the cage and rotatable about a second axis that is substantially perpendicular relative to the first axis, wherein the gyroscope wheel is operable to impose a controllable moment on the vibration producing structure to counter vibratory moments produced by the vibration producing structure;
   a planetary gear arrangement configured to transmit power to the gyroscope wheel to rotate the gyroscope wheel about the second axis; and
   a motor shaft extending along the first axis and penetrating the housing, the motor shaft supporting a sun gear operatively connected to the planetary gear arrangement.

2. The vibration control assembly of claim 1, wherein the planetary gear arrangement transmits power to the gyroscope wheel directly from an electric motor shaft of an electric motor.

3. The vibration control assembly of claim 1, wherein the planetary gear arrangement transmits power to the gyroscope wheel directly from a hydraulic motor shaft of a hydraulic motor.

4. The vibration control assembly of claim 1, wherein the planetary gear arrangement is coupled to an aircraft gearbox with a gearbox shaft.

5. The vibration control assembly of claim 1, further comprising a motor operatively coupled to the cage with the motor shaft to rotate the cage and to control precession of the vibration control assembly, the motor shaft rotatable about a motor axis, wherein the sun gear of the planetary gear arrangement rotates about a sun gear axis that coincides with the motor axis.

6. The vibration control assembly of claim 1, further comprising a motor operatively coupled to the cage to rotate the cage and to control precession of the vibration control assembly.

7. The vibration control assembly of claim 6, wherein the motor is operatively coupled to the gyroscope wheel and drives rotation of the gyroscope wheel.

8. The vibration control assembly of claim 6, further comprising a slip ring disposed between the motor and the cage.

9. The vibration control assembly of claim 1, wherein the gyroscope wheel is rotated at a constant speed.

10. The vibration control assembly of claim 1, wherein rotation of the cage about the first axis and rotation of the gyroscopic wheel about the second axis selectively adjusts the controllable moment.

11. The vibration control assembly of claim 1, wherein the planetary gear arrangement includes a planet gear shaft extending substantially parallel to the first axis, the planet gear shaft including at least one planet gear operable to rotate the gyroscopic wheel about the second axis.

12. The vibration control assembly according of claim 1, wherein the gyroscopic wheel includes a gyroscopic shaft extending along the second axis and a wheel segment extending along the first axis, the wheel segment being disposed to rotate about the second axis.

13. The vibration control assembly of claim 12, wherein the gyroscopic shaft supports first and second gyroscopic bearings, wherein rotation of the gyroscopic wheel produces a moment that is passed through the first and second gyroscopic bearings into the cage.

14. The vibration control assembly of claim 1, wherein the planetary gear arrangement includes a first planet gear shaft and a second planet gear shaft, and wherein each of the first and second planet gear shafts are coupled to the sun gear.

15. The vibration control assembly of claim 1, wherein electric motor permanent magnets are disposed along an outer perimeter of a wheel portion of the gyroscope wheel and at an inner portion of a motor stator, and wherein the magnets are configured to drive rotation of the gyroscope wheel.

* * * * *